United States Patent
Burkhardt

(10) Patent No.: US 10,302,474 B2
(45) Date of Patent: May 28, 2019

(54) INSERTION ULTRASONIC SENSOR ASSEMBLY

(71) Applicant: Georg Fischer Signet, LLC, El Monte, CA (US)

(72) Inventor: Gert Burkhardt, Pasadena, CA (US)

(73) Assignee: Georg Fischer Signet LLC, El Monte, CA (US)

( * ) Notice: Subject to any disclaimer, the term of this patent is extended or adjusted under 35 U.S.C. 154(b) by 101 days.

(21) Appl. No.: 15/672,716

(22) Filed: Aug. 9, 2017

(65) Prior Publication Data

US 2019/0049276 A1 Feb. 14, 2019

(51) Int. Cl.
*G01F 1/66* (2006.01)

(52) U.S. Cl.
CPC .................... *G01F 1/662* (2013.01)

(58) Field of Classification Search
CPC ....................................................... G01F 1/66
See application file for complete search history.

(56) References Cited

U.S. PATENT DOCUMENTS

| | | |
|---|---|---|
| 2,582,249 A | 1/1952 | Bendel |
| 3,332,446 A | 7/1967 | Mann |
| 3,490,496 A | 1/1970 | Stearns |
| 3,870,033 A | 3/1975 | Faylor et al. |
| 4,130,904 A | 12/1978 | Whalen |
| 4,236,509 A | 12/1980 | Takahashi et al. |
| 4,415,185 A | 11/1983 | Vinciguerra et al. |
| 4,545,244 A | 10/1985 | Yasuda et al. |
| 4,765,602 A | 8/1988 | Roeseler |
| 4,966,202 A | 10/1990 | Bryan et al. |
| 5,326,035 A | 7/1994 | Ohmi et al. |
| 5,385,664 A | 1/1995 | Oinuma et al. |
| 5,482,089 A | 1/1996 | Weber et al. |
| 5,678,809 A | 10/1997 | Nakagawa et al. |
| 5,868,924 A | 2/1999 | Nachtman et al. |
| 5,905,207 A | 5/1999 | Schalk |
| 5,954,965 A | 9/1999 | Kubota et al. |
| 6,156,578 A | 12/2000 | Tom |
| 6,176,138 B1 | 1/2001 | Barr et al. |

(Continued)

FOREIGN PATENT DOCUMENTS

| | | |
|---|---|---|
| DE | 19706486 A1 | 8/1998 |
| DE | 102008013224 | 9/2009 |

(Continued)

OTHER PUBLICATIONS

Bevilacqua, Anthony C., et al., "Advances in Resistivity Instrumentation for UPW Systems of the Future".

(Continued)

*Primary Examiner* — Jewel V Dowtin
(74) *Attorney, Agent, or Firm* — Tsircou Law, P.C.

(57) ABSTRACT

An insertion ultrasonic sensor assembly is provided having an elongated sensor body. The body includes two projections projecting from the distal end having a pair of ultrasonic transceivers. Each transceiver of the pair mounted to a corresponding projection. The assembly is mounted so that the sensor body projects into the container, having the distal end exposed to the flowing fluid, in manner that the measurement axis of the sensor body is oriented at an oblique angle relative to the flow of the fluid within the container.

6 Claims, 7 Drawing Sheets

(56) References Cited

U.S. PATENT DOCUMENTS

| | | |
|---|---|---|
| 6,234,163 B1 | 5/2001 | Garrod |
| 6,418,769 B1 | 7/2002 | Schreiner |
| 6,596,236 B2 | 7/2003 | DiMeo, Jr. et al. |
| 6,729,181 B2 | 5/2004 | Mayer et al. |
| 6,733,661 B2 | 5/2004 | Mukogawa et al. |
| 6,830,076 B1 | 12/2004 | Patel |
| 7,225,678 B2 | 6/2007 | Kandler et al. |
| 7,360,450 B2 | 4/2008 | Müller |
| 7,490,632 B2 | 2/2009 | Grebe |
| 7,550,979 B2 | 6/2009 | Zhou et al. |
| 7,954,387 B1* | 6/2011 | Furlong ............... G01F 1/74 73/861.28 |
| 7,987,732 B2 | 8/2011 | Konzelmann et al. |
| 8,523,432 B2* | 9/2013 | Mujumdar ............ G01K 1/14 374/208 |
| 8,776,593 B2 | 7/2014 | Margalit et al. |
| 8,955,392 B2* | 2/2015 | Liu ..................... G01F 1/66 73/861.28 |
| 9,188,259 B2 | 11/2015 | Fiolek et al. |
| 9,297,680 B2* | 3/2016 | Maruyama ........... G01F 1/662 |
| 9,422,953 B2* | 8/2016 | Ehrlich ................ F15D 1/00 |
| 10,041,620 B2 | 8/2018 | Balmer et al. |
| 2003/0011386 A1 | 1/2003 | Xie et al. |
| 2007/0018650 A1 | 1/2007 | Bhansali et al. |
| 2009/0085583 A1 | 4/2009 | Waid et al. |
| 2010/0201984 A1 | 8/2010 | Schuda et al. |
| 2011/0088483 A1 | 4/2011 | Will et al. |
| 2013/0061686 A1 | 3/2013 | Fujii et al. |
| 2018/0283917 A1* | 10/2018 | Murakami ............ G01F 1/667 |

FOREIGN PATENT DOCUMENTS

| | | |
|---|---|---|
| EP | 0582329 | 2/1994 |
| EP | 1099102 B1 | 5/2008 |
| EP | 1531731 B1 | 8/2012 |
| JP | 2002062275 | 2/2002 |
| JP | 2004044600 A | 2/2004 |
| JP | 05373607 B2 | 12/2013 |
| WO | WO2009144153 | 12/2009 |
| WO | WO2012/076612 | 6/2012 |

OTHER PUBLICATIONS

Bevilacqua, Anthony C., et al., "The Effect of Temperature, Temperature Error, and Impurities on Compensated Resistivity Measurements".

Bevilacqua, Anthony C., et al., "Ultrapure Water—The Standard for Resistivity Measurements of Ultrapure Water".

* cited by examiner

INSERTION ULTRASONIC SENSOR ASSEMBLY

FIELD OF THE INVENTION

The present invention relates generally to sensors for measuring fluids, more particularly, to insertion sensor assemblies for flow measurement.

BACKGROUND OF THE INVENTION

Insertion sensor assemblies typically comprise a sensor body inserted through a hole in a pipe, positioning a measuring component within the fluid therein, to determine parameters of the fluid, such as fluid flow.

Various measurement approaches have been used in insertion sensors to measure fluid flow. Such examples include paddlewheel and electromagnetic insertions flow sensors. Although such devices are generally effective, shortfalls exist. For examples, such sensor assemblies can suffer from insufficient linearity and dynamic range of measurements therefrom.

It should, therefore, be appreciated there remains a need for an insertion sensor assembly that addresses these concerns. The present invention fulfills these needs and others.

SUMMARY OF THE INVENTION

Briefly, and in general terms, an insertion ultrasonic sensor assembly 10 is provided having an elongated sensor body. The body includes two projections 16 projecting from the distal end having a pair of ultrasonic transceivers. Each transceiver of the pair is mounted to a corresponding projection. The assembly is mounted so that the sensor body projects into the container or pipe, having the distal end exposed to the flowing fluid, in manner that the measurement axis of the sensor body is oriented at an oblique angle relative to the flow of the fluid within the container.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
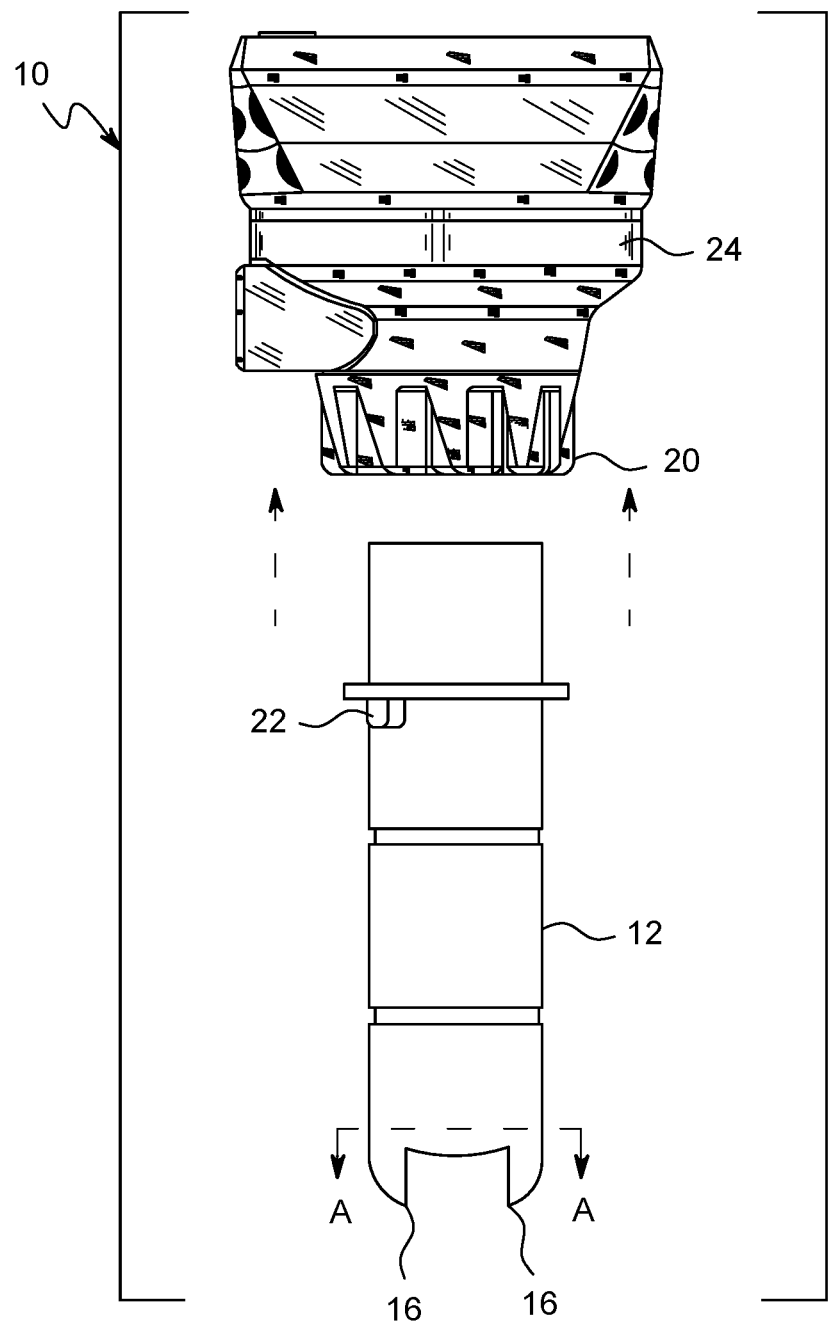
FIG. 1 is a partially exploded perspective view of an insertion ultrasonic sensor assembly in accordance with the present invention, depicting an electronics housing mounted atop a sensor body.
Figure 2:
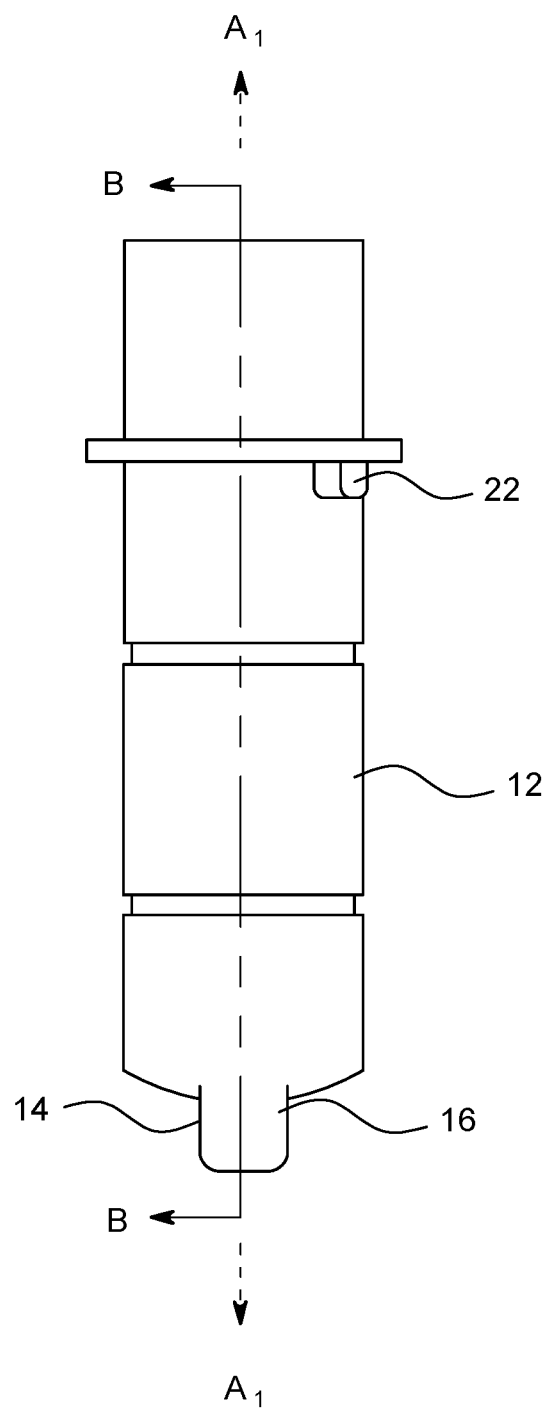
FIG. 2 is a side view of the sensor body of the ultrasonic sensor assembly of FIG. 1.
Figure 4:
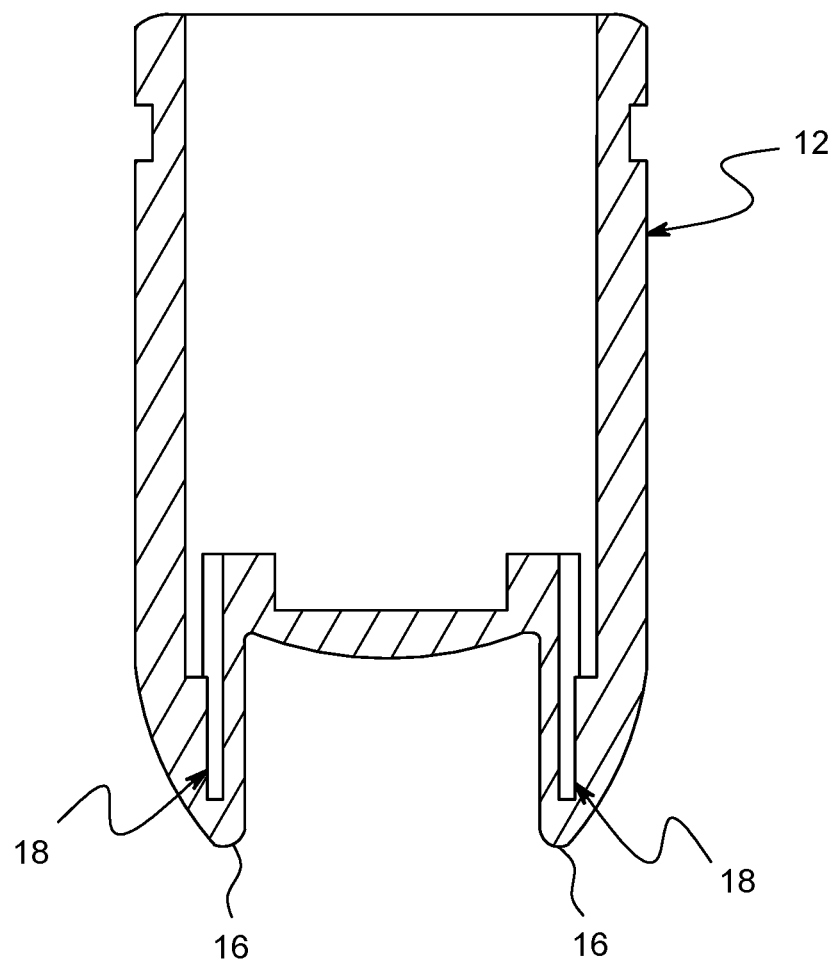
FIG. 4 is a cross sectional view of the distal portion of the sensor body of the ultrasonic sensor assembly of FIG. 1, taken along line B-B (FIG. 2).

Referring now to the drawings, and particularly FIGS. 1 and 2, there is shown an ultrasonic sensor assembly 10 having an elongated sensor body 12 that terminates in a distal end 14. The body 12 includes two projections 16 projecting from the distal end in longitudinal alignment and spaced relationship. The two projections define a measurement axis ($A_m$). The assembly 10 further includes a pair of ultrasonic transceivers 18 (FIG. 4). Each transceiver of the pair mounted to a corresponding projection 16. The pair of ultrasonic transceivers define a measurement section therebetween, along the measurement axis ($A_m$). The assembly 10 further includes a mounting assembly 20 configured to couple to a wall of a container (e.g., pipe 70 (FIG. 7) of flowing fluid. The assembly is mounted so that the sensor body projects into the container, having the distal end exposed to the flowing fluid, in manner that the measurement axis of the sensor body is oriented at an oblique angle (A) relative to the flow of the fluid within the container. In this manner, the sensor assembly enables determination of the fluid flow.

Figure 3:
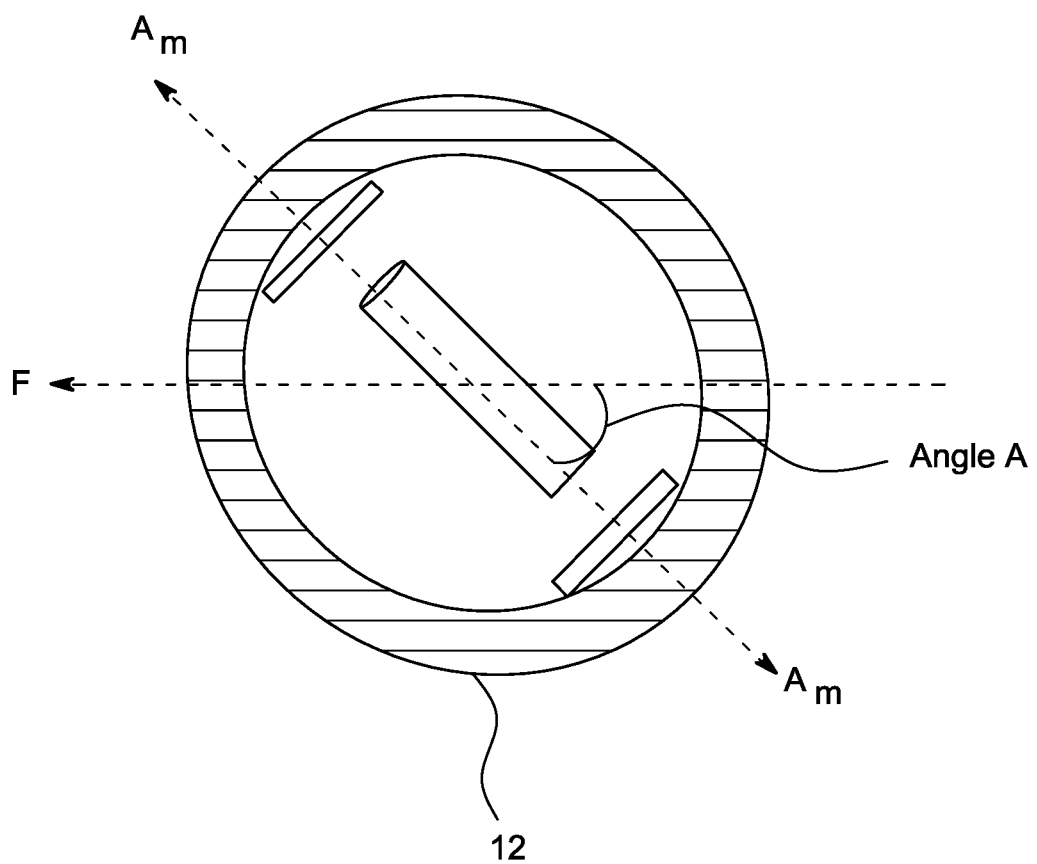
FIG. 3 is a cross sectional view of a distal portion of the sensor body of the ultrasonic sensor assembly of FIG. 1, taken along line A-A.

With reference to FIG. 3, the ultrasonic transceivers 18 are positioned within recesses of the projections such that the transceivers are in faced alignment with each other, such that communication therebetween is aligned with the measurement axis ($A_m$), providing a measurement section therebetween. The assembly is mounted such that the measurement axis is oriented at an angle (A) relative to the direction of fluid flow, depicted by arrow (F). In the exemplary embodiment, angle A is about 45 degrees. The sensor body 14 includes a stop 22 (FIG. 2) that cooperates with the mounting assembly 20 to fix the sensor body at its orientation (angle A) relative to flow, when mounted. In the exemplary embodiment, the stop 22 is circumferentially spaced relative at angle (A) relative to the measurement axis ($A_m$).

The sensor body 12 is generally cylindrical, defining a longitudinal axis ($A_1$), and the projections 16 extend in alignment with the longitudinal axis at the distal end 14 of the sensor body. The projections 16 sufficiently extend beyond the portion of the distal end 14 therebetween, so that the ultrasonic transceivers 18 have unobstructed communication. As best seen in FIG. 4, the transceiver are further aligned with the longitudinal axis ($A_1$) in facing relationship.

The ultrasonic transceivers are connected to electronics in housing 24 to establish a transit time flow measurement system using a commercially available ASIC chip to drive the transceivers for sending ultrasonic pulses in both directions and to measure the time of flight of the pulses in the fluid. According to standard techniques for such flow meters, the velocity of the fluid can be calculated from the difference of the upstream and downstream transit time. Further calculations in the electronics will accommodate calibration and correction of geometry, temperature and viscosity influences and imperfections of the timing electronics. The resulting fluid velocity will be a measure of the desired flow rate, given the cross-section of the pipe. The transceivers are piezoelectric discs in thickness resonance mode, commercially available and typically made from lead zirconate titanate (PZT) ceramic. The chosen resonant frequency for the exemplary embodiment is high at 4 MHz to allow for small and compact discs that can be installed in the limited space of the protrusions 16. To allow for good acoustic coupling, the transceiver discs are bonded with epoxy, silicone or polyurethane resin to the wall material of the protrusions 16.

Figure 5:
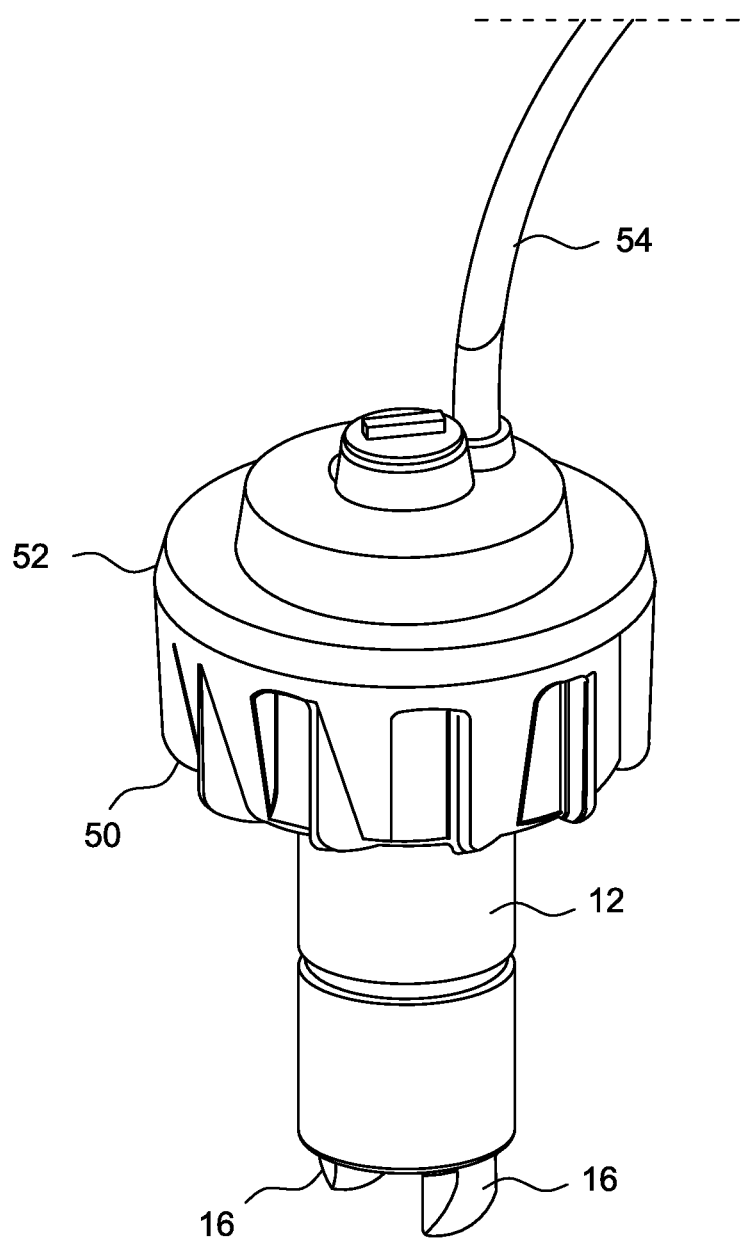
FIG. 5 is a perspective view of a second embodiment of an insertion ultrasonic sensor assembly in accordance with the present invention.
Figure 6:
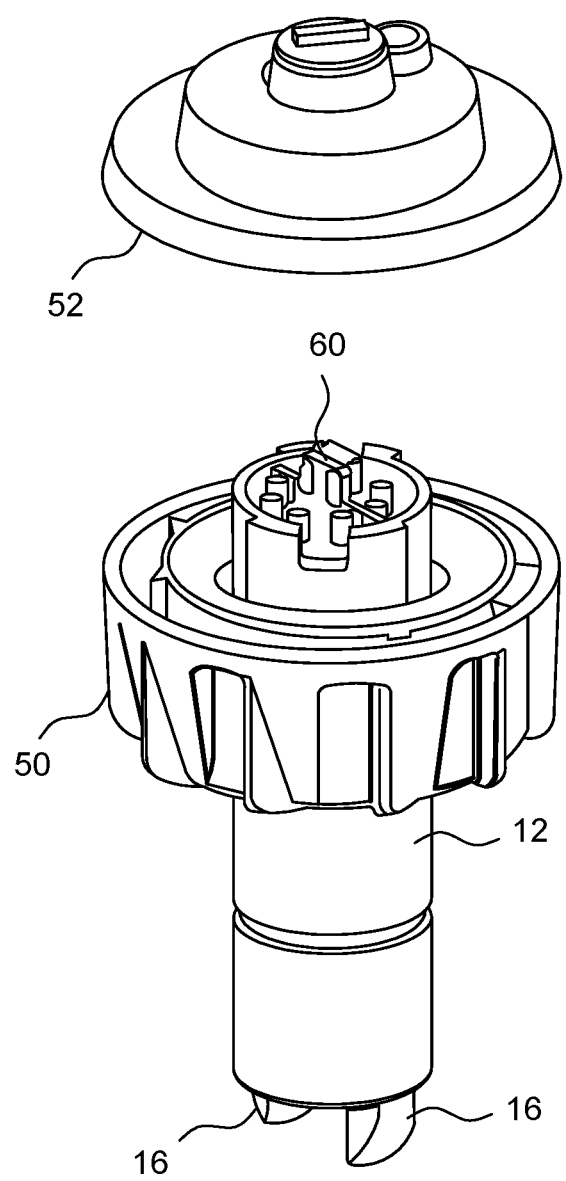
FIG. 6 is a partially exploded perspective view of the insertion ultrasonic sensor assembly of FIG. 5, depicting an electronics mounted within the sensor body.

With reference to FIGS. 5 and 6, the sensor body 12 can be configured to house electronics 60 therein, in communication with the transceivers 18. The mounting assembly 50 secures the sensor body 12 to a housing 52 and to the container (pipe) in the manner discussed herein. Wiring 54 extends from the housing to provide measurement signals to other user equipment. These signals will be derived with above mentioned techniques from the transceiver response via the electronics within the housing.

Figure 7:
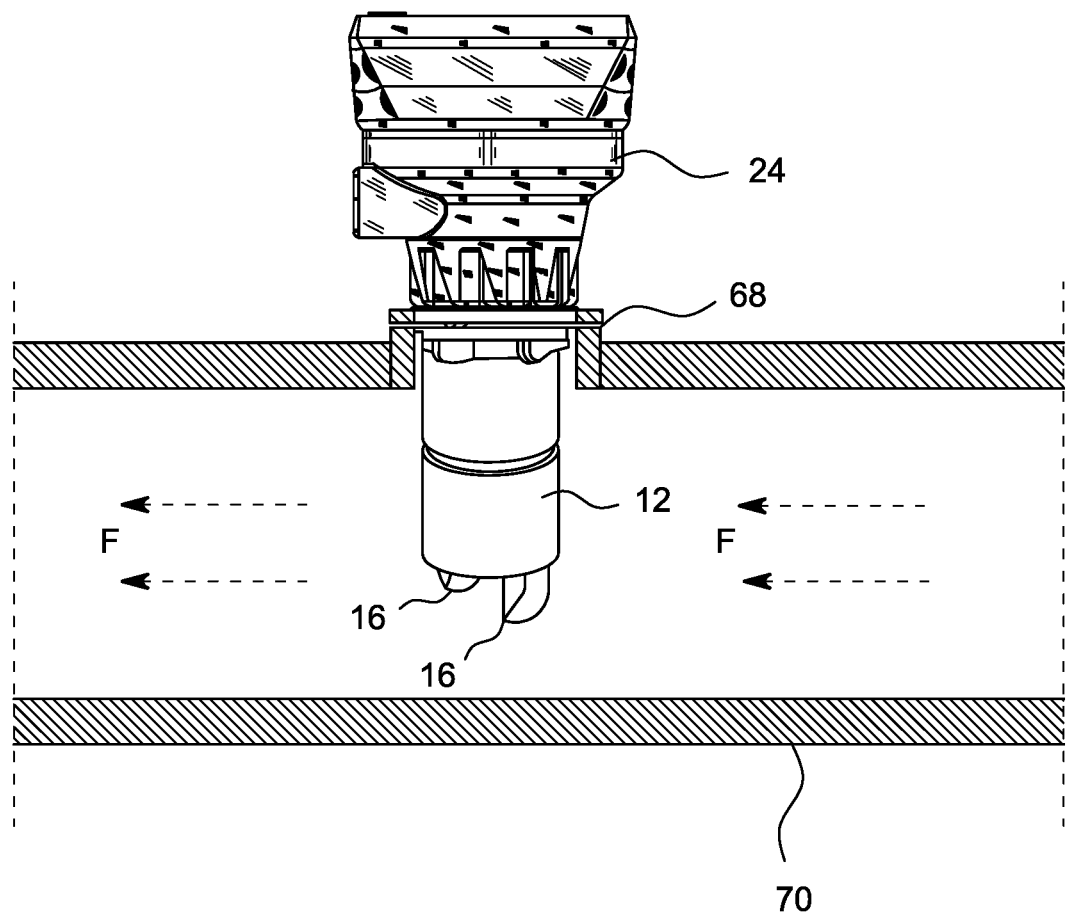
FIG. 7 is side view of the sensor assembly of FIG. 1 mounted to a pipe (shown in cross section).

With reference to FIGS. 1 and 7, the mounting assembly 20 secures the sensor body 12 to a housing 24, which comprises electronic components in communication with the transceivers 18. The mounting assembly further mates with a corresponding opening 68 on the container (pipe 70). The opening can include threaded wall to secure the sensor assembly 10 thereto. The stop 22 cooperates to ensure that the sensor assembly is oriented at a fixed angle relative to the fluid flow within the pipe. Alternatively, the sensor assembly could have a threaded part to be installed into a threaded opening in the pipe.

It should be appreciated from the foregoing that the present invention provides an insertion ultrasonic sensor assembly having an elongated sensor body. The body includes two projections projecting from the distal end having a pair of ultrasonic transceivers. Each transceiver of the pair mounted to a corresponding projection. The assembly is mounted so that the sensor body projects into the container, having the distal end exposed to the flowing fluid, in manner that the measurement axis of the sensor body is oriented at an oblique angle relative to the flow of the fluid within the container.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. An insertion ultrasonic sensor assembly, comprising:
an elongated sensor body having a distal end, the distal end including two projections at the distal end, the two projections defining a measurement axis;
a pair of ultrasonic transceivers, each transceiver of the pair mounted to a corresponding projection of the two projections, the pair of ultrasonic transceivers defining a measurement section therebetween, along the measurement axis; and
a mounting assembly configured to couple to a wall of a container of flowing fluid so that the sensor body projects into the container having the distal end exposed to the flowing fluid, in manner that the measurement axis of the sensor body is oriented at an oblique angle relative to the flow of the fluid within the container.

2. The insertion ultrasonic sensor assembly as defined in claim 1, wherein the sensor body defines an interior cavity that retains electronic components in operative communication with the pair of ultrasonic transceivers.

3. The insertion ultrasonic sensor assembly as defined in claim 1, further comprising an electronics housing coupled atop the sensor body, spaced apart from the distal end of the sensor body.

4. The insertion ultrasonic sensor assembly as defined in claim 1, wherein the sensor body includes a stop proximate to a proximal end thereof that cooperatively fixes the orientation of the sensor body relative to the fluid flow, when mounted the assembly is mounted onto the container, so that the measurement axis is at a fixed oblique angle.

5. The insertion ultrasonic sensor assembly as defined in claim 1, wherein the two projections of the sensor body, each define an internal cavity within which a transceiver of the pair of ultrasonic transceivers is mounted therein.

6. The insertion ultrasonic sensor assembly as defined in claim 1, wherein the distal end of sensor body includes an end wall portion, and the two projections extend longitudinally beyond the end wall portion.

* * * * *